(12) United States Patent
Watanabe et al.

(10) Patent No.: US 6,972,718 B2
(45) Date of Patent: Dec. 6, 2005

(54) POSITION CALCULATING METHOD, SIGNAL RECEIVER, AND POSITION CALCULATING APPARATUS THEREFOR

(75) Inventors: Koji Watanabe, Kokubunji (JP); Atsushi Ogino, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/799,631

(22) Filed: Mar. 15, 2004

(65) Prior Publication Data

US 2004/0189522 A1    Sep. 30, 2004

(30) Foreign Application Priority Data

Mar. 24, 2003    (JP)    ............... 2003-080154

(51) Int. Cl.[7] ............................... G01S 1/24
(52) U.S. Cl. ..................... 342/387; 342/457
(58) Field of Search ............... 342/387, 442, 342/450, 457; 455/456.1, 456.5, 456.6

(56) References Cited

U.S. PATENT DOCUMENTS 5,363,109 A * 11/1994 Hofgen et al. ............... 342/31
6,011,974 A * 1/2000 Cedervall et al. ........ 455/456.4
6,807,427 B1 * 10/2004 Sakamoto et al. ....... 455/456.1

2002/0132626 A1 * 9/2002 Tsunehara et al. .......... 455/456
2004/0254980 A1 * 12/2004 Motegi et al. .............. 709/203

FOREIGN PATENT DOCUMENTS

JP    2000-156882    11/1998

OTHER PUBLICATIONS

A. Ogino et al., "Integrated Wireless LAN Access System—Study on Location System", Hitachi, Ltd., Central Research Laboratory, 2003, with English translation, pp. 662, and 1-5.

* cited by examiner

*Primary Examiner*—Dao Phan
(74) *Attorney, Agent, or Firm*—Reed Smith LLP; Stanley P. Fisher, Esq.; Juan Carlos A. Marquez, Esq.

(57) ABSTRACT

A method of measuring reception timings of signals transmitted and received between base stations and a mobile station and calculating the position of the mobile station by using the reception timings and the reception positions of the signals comprises the steps of obtaining the address information items necessary to specify incoming signals used for the position calculation, analyzing address information items included in the incoming signals, and selecting incoming signals used for position calculation according to a result of comparing the obtained address information items with address information items analyzed in accordance with the incoming signals. A signal incoming from a desired radio station is thus selected and used for position calculation.

15 Claims, 12 Drawing Sheets

FIG. 11

| BASE STATION IDENTIFIER (161) | CHANNEL IDENTIFIER (162) | BASE STATION ANTENNA COORDINATES (163) | IP ADDRESS (164) | MAC ADDRESS (165) |
|---|---|---|---|---|
|  |  |  |  |  |
| -------- | -------- | -------- | -------- | -------- |
|  |  |  |  |  |

FIG. 12

| MOBILE STATION IDENTIFIER (171) | BASE STATION IDENTIFIER (172) | IP ADDRESS (173) | MAC ADDRESS (174) |
|---|---|---|---|
|  |  |  |  |
| -------- | -------- | -------- | -------- |
|  |  |  |  |

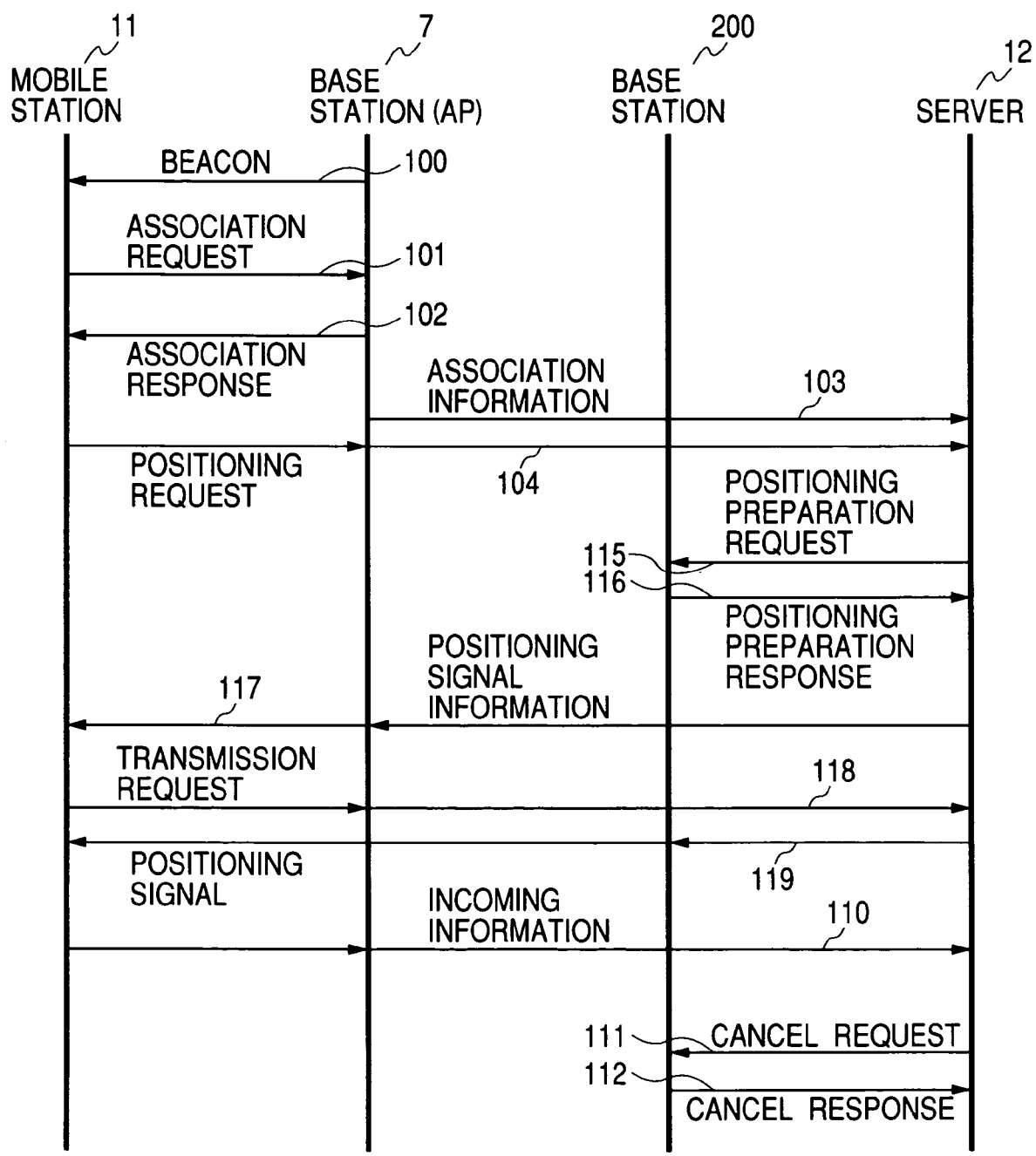

POSITION CALCULATING METHOD, SIGNAL RECEIVER, AND POSITION CALCULATING APPARATUS THEREFOR

CLAIM OF PRIORITY

The present application claims priority from Japanese application JP 2003-080154 filed on Mar. 24, 2003, the content of which is hereby incorporated by reference into this application.

FIELD OF THE INVENTION

The present invention relates to a position calculating method, a receiver, and a position calculating apparatus for calculating the position of a mobile station by using a radio signal.

BACKGROUND OF THE INVENTION

For a wireless LAN system, a GPS (Global Positioning System) or a system using a base station or CS-D (Cell Station ID) is proposed. Though the former system makes it possible to detect the position of a mobile station at a high accuracy of approx. 10 m, a mobile station must have a GPS receiver. Though the latter system does not require a GPS receiver, it is impossible to obtain only an accuracy of an arrangement interval or so between base stations in order to obtain the position of the nearest mobile station at which received power is maximized for a mobile station in accordance with the CD-ID of the nearest base station.

[Patent Document 1]
   Japanese Patent Laid-Open No. 2000-156882

To perform positioning according to the trilateration using a radio signal, at least three base stations around a mobile station obtains a propagation time difference from the reception time of a signal sent from the mobile station to calculate the position of the mobile station. Moreover, the three base stations mutually receive signals to correct time shifts between the base stations. A signal may be received from a station other than a desired mobile station or a desired base station (for example, from the base station 10 in FIG. 1 or mobile station 201 in FIG. 13) in a channel for performing positioning. In this case, for example, when misidentifying a signal 15 received from a station other than a desired mobile station as a signal incoming from a mobile station whose position must be obtained and using the signal 15 for position calculation, it is impossible to calculate a correct position.

In the case of the wireless LAN system, a businessman or an individual can optionally set a base station and freely move a mobile station. Therefore, not all radio stations are incorporated into and controlled by a system for performing position calculation and it is difficult to perform the control for stopping transmission of every signal unnecessary for position calculation. Therefore, it is necessary to select a desired signal out of many signals transmitted and received between a base station and a mobile station and use the signal for positioning.

SUMMARY OF THE INVENTION

The first aspect of the present invention is a position calculating method of measuring the reception timing of a signal transmitted and received between a base station and a mobile station and calculating the position of the mobile station by using the reception timing and the reception position of the signal, which obtains the address information items necessary to specify incoming signals used for the position calculation, analyzes the address information items included in the incoming signals, and selects incoming signals used for position calculation in accordance with a result of comparing the obtained address information items with the address information items analyzed in accordance with the incoming signals.

The second aspect of the present invention is a receiver for receiving signals transmitted from a mobile station in order to calculate the position of the mobile station by using reception timings and reception positions of the signals, which comprises information obtainment unit for obtaining the address information items necessary to specify incoming signals used for the position calculation, storage unit for storing the incoming signals, address information analysis unit for analyzing the address information items included in the incoming signals, and control unit for selecting incoming signals used for position calculation in accordance with a result of comparing the obtained address information items with the address information items analyzed in accordance with the incoming signals.

Third aspect of the present invention is a position calculating apparatus for calculating the position of a mobile station by using reception timings and reception positions of signals transmitted and received between a base station and the mobile station, which communicates the address information items necessary to specify incoming signals used for the position calculation to the base station and/or mobile station.

The present invention obtains the address information items necessary to specify incoming signals used for position calculation, analyzes the address information items included in the incoming signals, and selects incoming signals use for position calculation in accordance with a result of comparing the obtained address information items with the address information items analyzed in accordance with the incoming signals. That is, signals incoming from a mobile station or base station are selected at the reception side of signals used for positioning to calculate the position of the mobile station. Therefore, even when a mobile station or base station receives an unexpected signal from a walkie-talkie unrelated to positioning in a channel for performing positioning, it is possible to calculate a position by using correct information and restrain deterioration of a positioning accuracy.

BRIEF DESCRIPTION OF THE DRAWINGS

FIG. 11 is a block diagram of the base station information stored in a memory 152 of the first embodiment of the present invention;

FIG. 12 is a block diagram of the mobile station information stored in the memory 152 of the first embodiment of the present invention;

DESCRIPTION OF THE PREFERRED EMBODIMENTS

Figure 1:
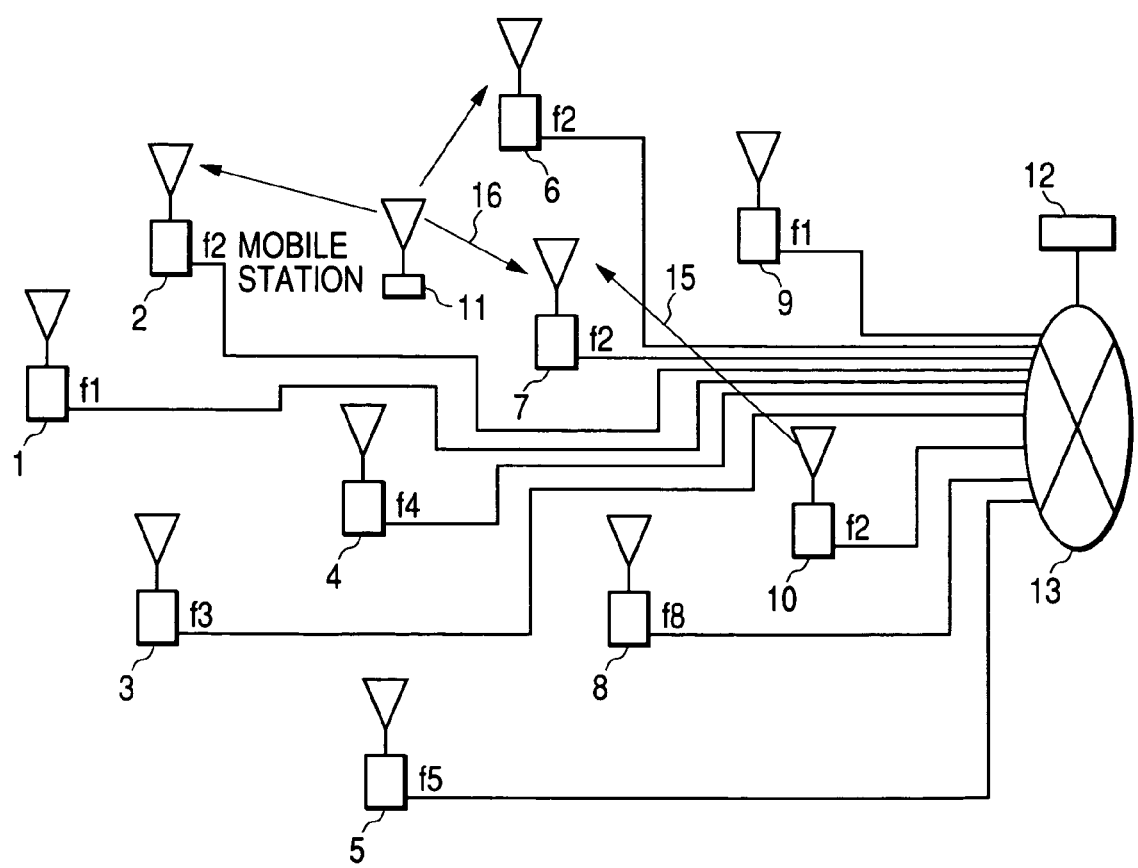
FIG. 1 is a block diagram of a radio communication system of an embodiment of the present invention.

FIG. 1 is a block diagram of a radio communication system of an embodiment of the present invention.

Base stations 1, 2, 3, 4, 5, 6, 7, 8, 9, and 10 are set around a mobile station 11. The base stations 1 to 10 are connected to a server 12 via a network 13. A plurality of base stations receives signals from the mobile station 11 or the mobile station 11 receives signals from a plurality of base stations, obtains a propagation time difference from reception timings of signals, and calculates the position of the mobile station 11.

Figure 2:
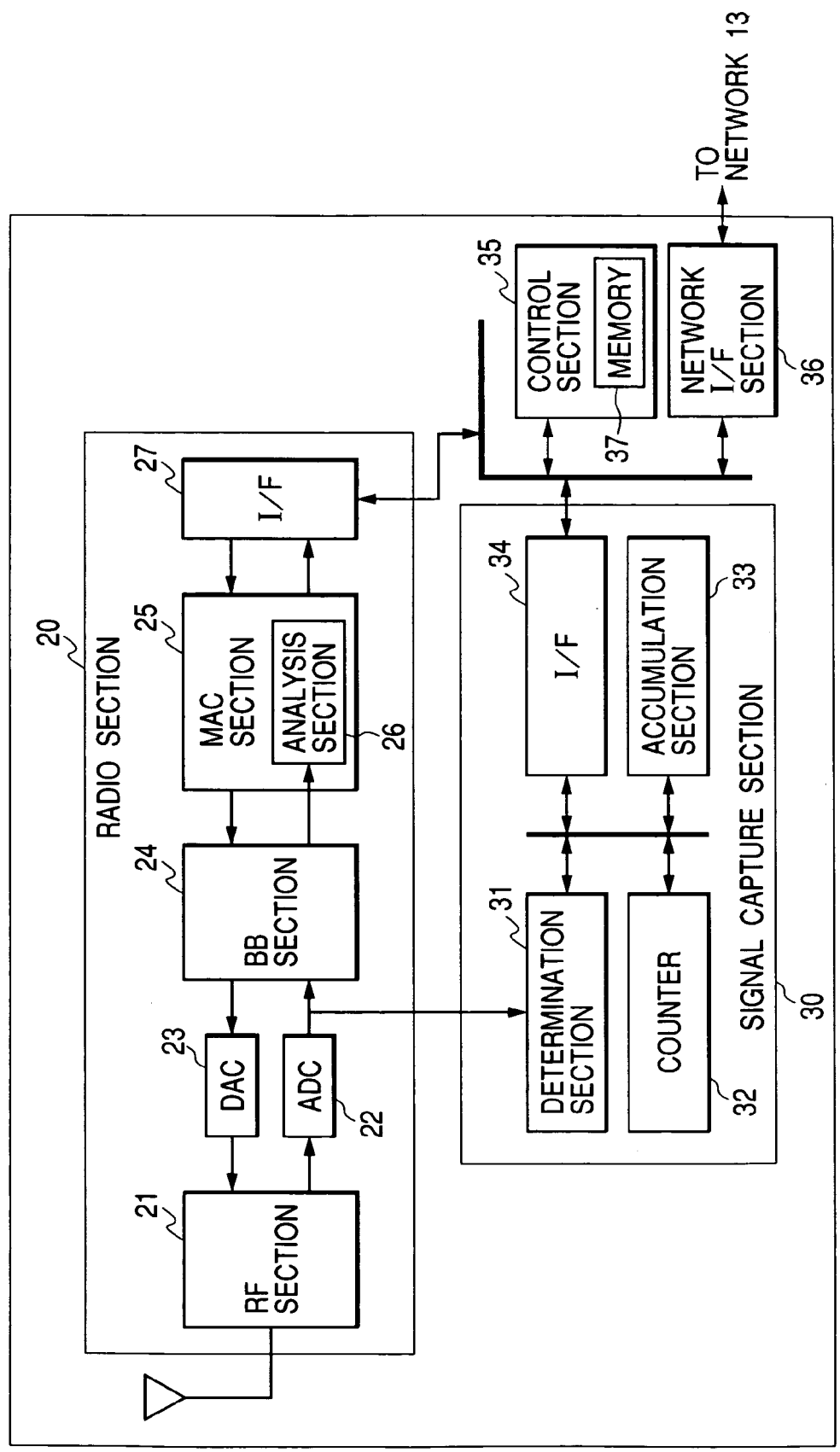
FIG. 2 is a block diagram showing a configuration of a base station of a first embodiment of the present invention.

FIG. 2 is a block diagram showing a configuration of the base stations 1 to 10 of a first embodiment.

A network I/F section 36 is an interface for connecting a base station with the network 13. A control section 35 controls a radio section 20 and a signal capture section 30. Moreover, the control section 35 selects incoming signals recorded in an accumulation section 33 by using the address information items on analyzed incoming signals. Furthermore, the control section 35 records the information items communicated from an analysis section 26 in a memory 37.

An I/F 27 is an interface of the radio section 20, which mediates information and control signals input to or output from the radio section 20. A MAC section 25 sends a MAC PDU (MAC Protocol Data Unit) to a base band section (BB section) 24. The control information on the MAC PDU sent from the BB section 25 is analyzed by the analysis section 26 to process the MAC PDU in accordance with a MAC protocol.

The BB section 24 assembles a packet in accordance with the MAC PDU, modulates a digital signal, and sends the modulated digital signal to a DA converter (DAC) 23. The DAC 23 converts the digital signal sent from the BB section 24 into an analog signal and sends the analog signal to an RF section 21.

Moreover, the BB section 24 demodulates a signal sent from the AD converter (ADC) 22 and sends the MAC PDU to a MAC section 25. The ADC 22 converts an analog signal incoming from the RF section 21 into a digital signal and sends the digital signal to the BB section 24 and signal capture section 30 (determination section 31).

An I/F 34 is an interface of the signal capture section 30, which mediates information and control signals input to or output from the signal capture section 30. The determination section 31 determines whether to record an incoming signal in the accumulation section 33 and the accumulation section 33 records an incoming signal sent from the radio section 20 in accordance with the determination result. For example, the determination section 31 calculates an output signal amplitude of the ADC 22 and determines whether to record an output signal of the ADC 22 in the accumulation section 33 when the amplitude exceeds a threshold value. A counter 32 generates a time stamp for recording the reception time of a signal.

Figure 3:
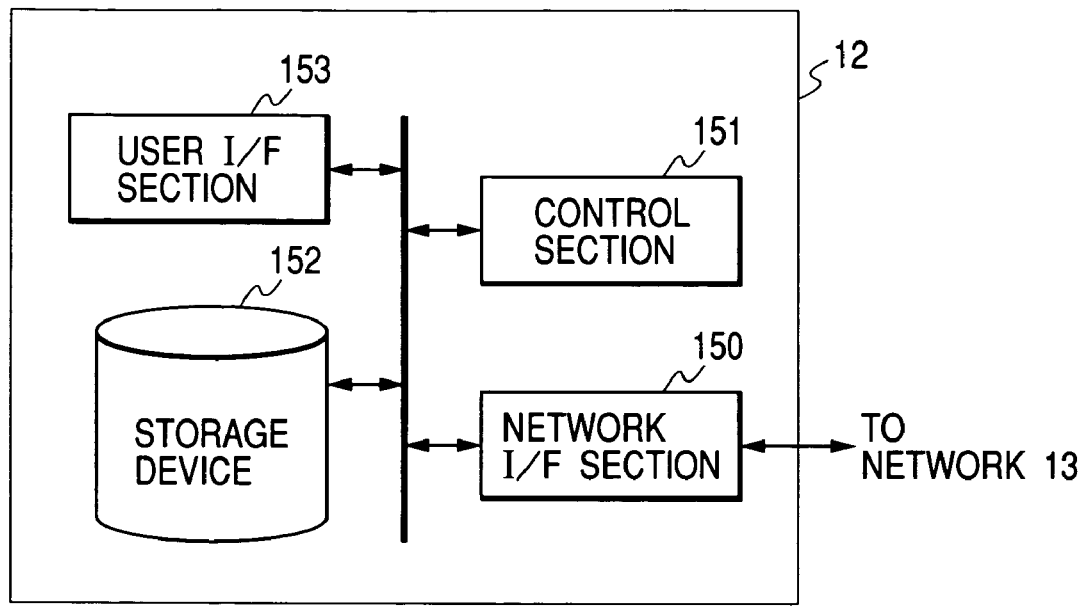
FIG. 3 is a block diagram showing a configuration of a server 12 of the first embodiment of the present invention.

FIG. 3 is a block diagram showing a configuration of the server 12 of the first embodiment of the present invention.

A network interface 150 is an interface between the network 13 and the server 12.

A user I/F section 153 is an interface between the server 12 and a user, which serves as an interface to a display unit and a keyboard.

A control section 151 generates and analyzes signals transmitted and received through the network 13 (for example, refer to FIG. 5 and 16), controls transmission and reception, and calculates the position of the mobile station 11.

A memory 152 stores base station information (FIG. 11) and mobile station information (FIG. 12) on a radio communication system of an embodiment of the present invention.

Figure 4:
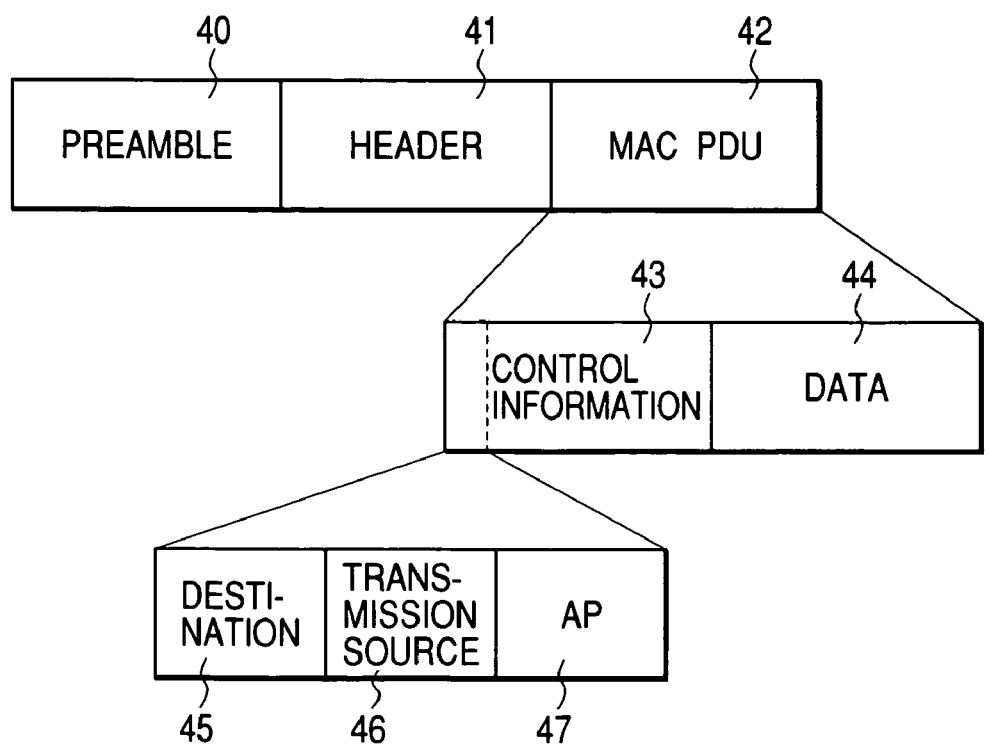
FIG. 4 is a format diagram of a packet transmitted and received for an embodiment of the present invention.

FIG. 4 is a format diagram showing a configuration of a packet transmitted and received through the network 13 for an embodiment of the present invention.

The packet is constituted by a preamble 40, header 41, and MAC PDU 42 an assembled by the BB section 24.

The preamble 40 and header 41 serve as control information for fetching the MAC PDU by demodulating it at the reception side. The MAC PDU 42 constituted by control information 43 and data 44. The control information 43 includes destination information 45, source information 46, and access point information 47. For example, the destination information 45 shows the MAC address of a destination of a packet, the source information 46 shows the MAC address of the source of a packet, and the access point information 47 shows the MAC address of a base station (access point) through which a packet goes.

More specifically, when transmitting a packet from the mobile station 11 to the server 12 via the base station 2, the destination information 45 serves as the MAC address of the server 12, the source information 46 serves as the MAC address of the mobile station 11, and the access point information 47 serves as the MAC address of the base station 2. The destination information 45, source information 46, and access point information 47 are allowed as long as they are control information capable of specifying the destination, source, and access point of a packet through which the packet goes. For example, it is also allowed to use the IP (Internet Protocol) address of the destination of a packet for the destination information 45, the IP address of the source of a packet for the source information 46, and the IP address of a base station for the access point information 47.

Figure 5:
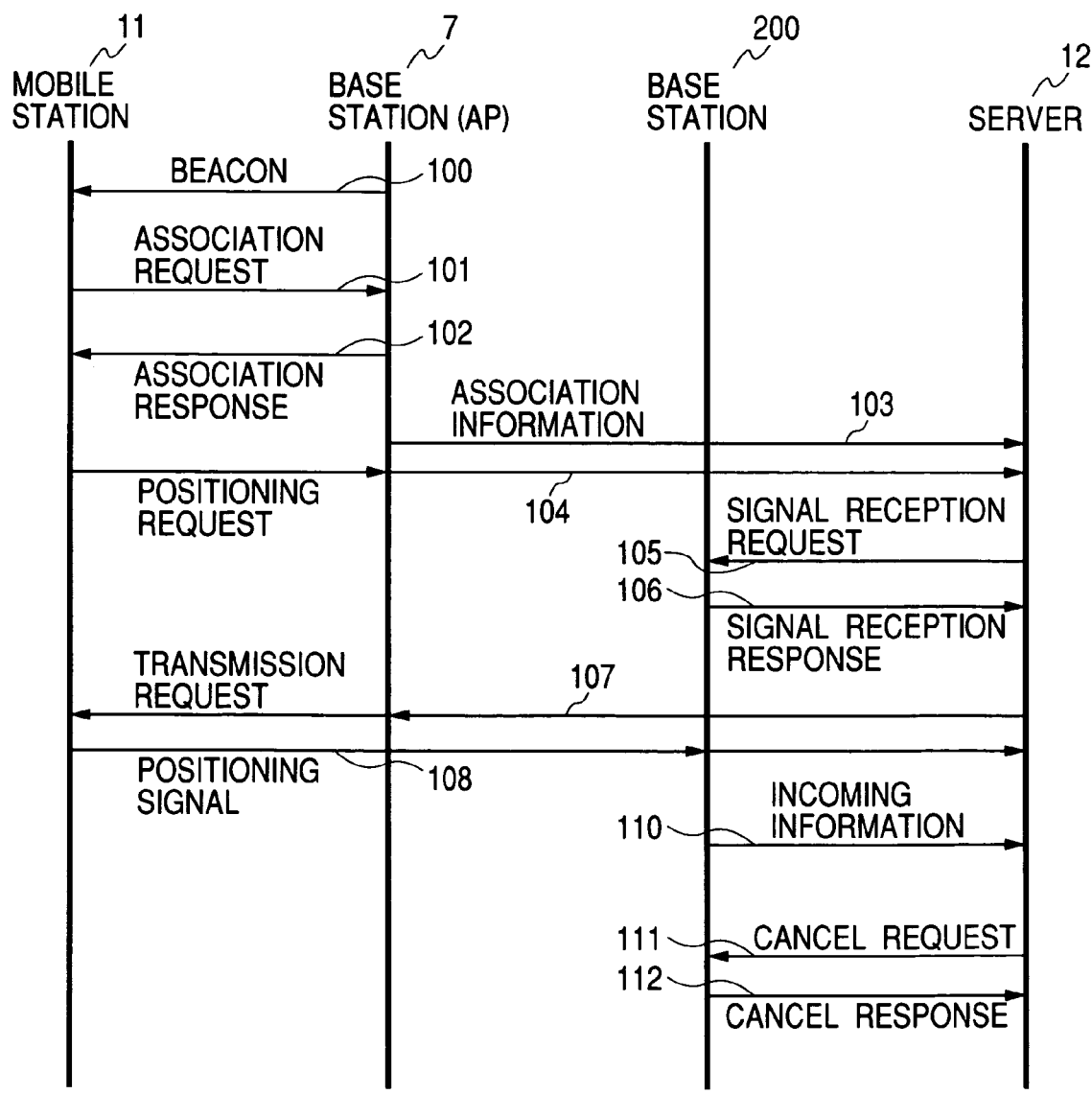
FIG. 5 is a sequence diagram for position calculation of the first embodiment of the present invention.

FIG. 5 is a sequence diagram for position calculation of the first embodiment of the present invention, which shows signals transmitted and received when a plurality of base stations receives signals from the mobile station 11 and the server 12 calculates the position of the mobile station 11.

The base station 7 regularly transmits a beacon and communicates the MAC address of the base station 7 and an ESS-ID showing the network name of a wireless LAN to peripheral stations (100).

The mobile station 11 receiving a beacon transmits an association request including the MAC address of the mobile station 11 to the base station 7 to request the connection to the wireless LAN.

The base station 7 receiving the association request (101) transmits an association response to the mobile station 11 in accordance with an authentication result of the mobile station 11 to communicate success or fail of association (connection to wireless LAN) (102). When succeeding in the association, the mobile station 11 can communicate with the server 12 through the network 13 by using the base station 7 as an access point.

When the mobile station 11 succeeds in the association, the base station 7 transmits the association information including the MAC address of the mobile station 11 and that of the base station 7 to the server 12 (103).

When the mobile station 11 transmits a positioning request (104) to the server 12, the server 12 selects a plurality of base stations 200 for reception positioning signals {at least three (such as base stations 2, 6, and 7) in order to obtain a two-dimensional measuring result} (the selected base stations are hereafter explained as "base stations 200"). It is allowed to include the base station 7 with which the mobile station 11 associates in base stations for reception positioning signals.

Moreover, the server 12 transmits a signal reception request to the selected base station 200 (105). The signal reception request (105) includes the mobile station 11 to be positioned, base station 7, MAC address of the server 12, and the information on a communication channel through which a positioning signal is transmitted and received.

The base station 200 receiving the signal reception request (105) transmits a signal reception response to the server 12 (106).

After receiving the signal reception response (106) from the base station 200, the server 12 transmits a transmission request of a positioning signal to the mobile station 11 (107). The base station 200 for receiving a positioning signal receives the transmission request signal (107) and uses the reception time of the transmission request signal as the criterion of the reception time of the positioning signal (108).

The mobile station 11 receiving the positioning-signal transmission request (107) transmits a positioning signal (108). By using a ping from the server 12 to the mobile station 11 for the transmission request signal (107) and positioning signal (108), it is possible to use an echo request message as the transmission request signal (107) and a response (echo message) to the echo request message as the positioning signal (108).

The base station 200 receives the transmission request (107) and positioning signal (108) and transmits the incoming signal and its reception time to the server 12 as reception information (110).

The server 12 receiving the incoming information (110) from the base station 200 transmits a positioning cancel request to the base station 200 (111) and the base station 200 receiving the cancel request (111) transmits a cancel response to the server 12 (112).

Figure 6:
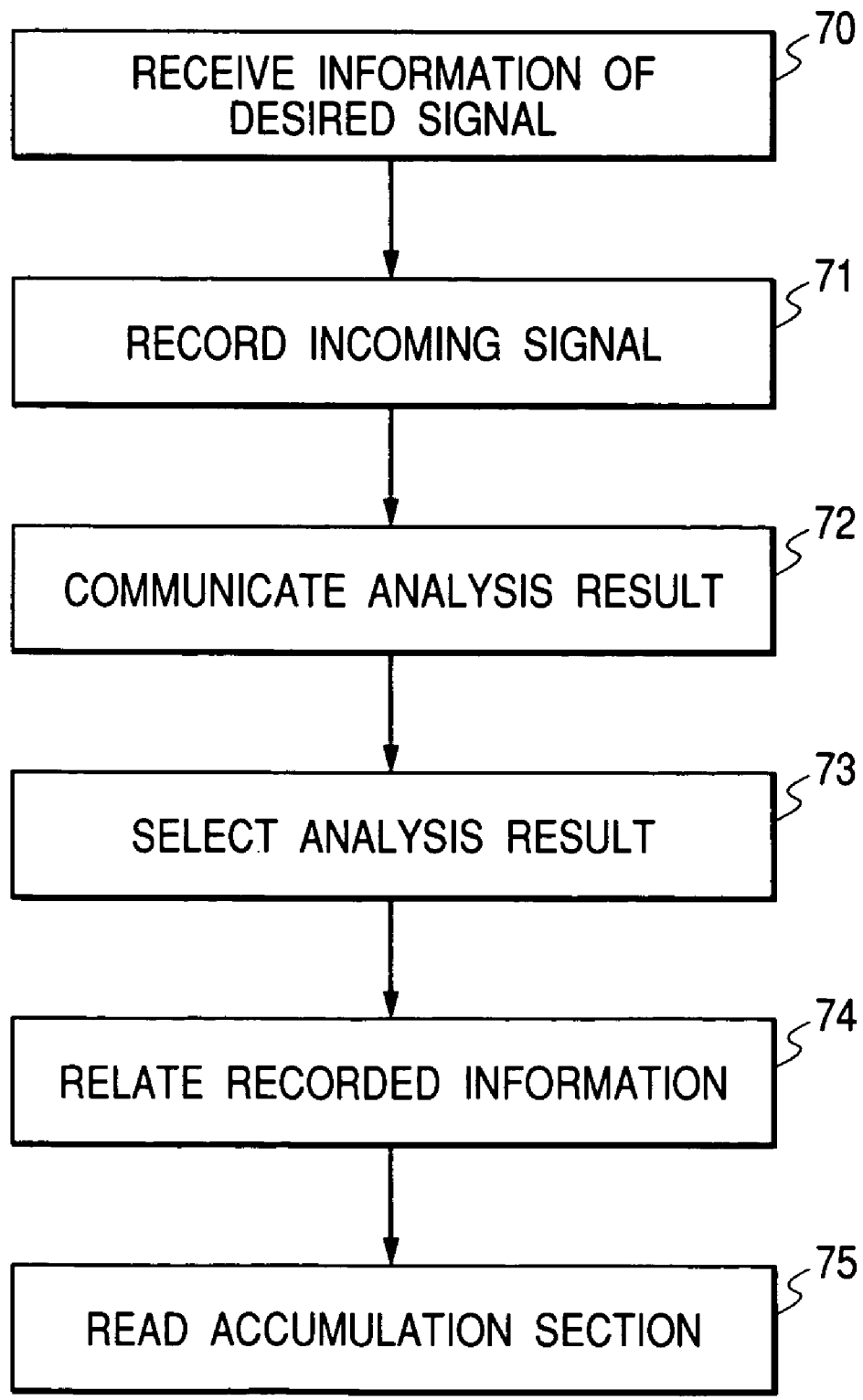
FIG. 6 is a flowchart of the positioning-signal reception processing of the first embodiment of the present invention.

FIG. 6 is a flowchart of positioning-signal reception processing at the base station 200 of the first embodiment of the present invention.

First, the control section 35 receives the address information items (destination information, source information, and access point information) on the packet of a desired signal (signal used for positioning) (step 70). These information items necessary for positioning are transmitted from the server 12 in accordance with the signal reception request 105 (refer to FIG. 5). Moreover, when receiving the signal reception request (105), the control section 35 of the base station 200 clears the information items recorded in the internal memory 37 and accumulation section 33 and initializes positioning.

The control section 35 records incoming information in the accumulation section 33 in accordance with a determination result by the determination section 31 (step 71). Moreover, the control section 35 reads out a recording start time from the counter 32 and records the time in the accumulation section 33. It is allowed for the control section 35 to record a record end time.

Furthermore, the analysis section 26 analyzes the destination information, source information, and access point information on the packet of incoming signals and communicates these information items to the control section 35 (step 72).

Furthermore, the control section 35 selects a desired signal or packet suitable for the address information communicated in step 70 by using the destination information, source information, and access point information communicated in step 72 (step 73).

Furthermore, the control section 35 relates the signal selected in step 73 with a packet and a signal recorded in the accumulation section 33 (step 74) and reads out the signal selected in step 73 and an incoming signal corresponding to the packet and its time stamp from the accumulation section 33 (step 75).

Thereafter, the control section 35 transmits the information read out in step 75 to the server 12 as the incoming information (110) and the server 12 uses the incoming information (110) for position calculation of the mobile station 11.

Figure 7:
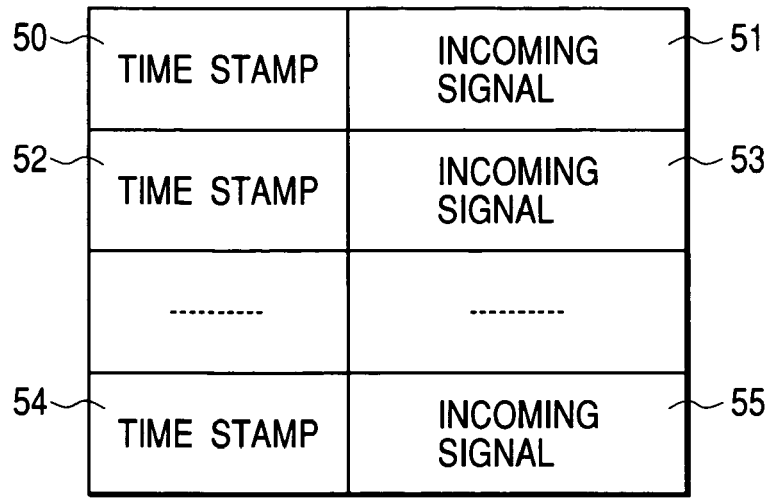
FIG. 7 is a block diagram of the information recorded in an accumulation section 33 of the first embodiment of the present invention.

FIG. 7 is a block diagram of the information recorded in the accumulation section 33 of the first embodiment of the present invention.

The information recorded in the accumulation section 33 is recorded in which a time stamp 50 and the like are related with incoming information 51 and the like.

The incoming signals 51, 53, and 55 are incoming signals of the base station 38 output from the ADC 22. The time stamps 50, 52, and 54 show recording start times of the accumulated incoming signals 51, 53, and 55 respectively. Incoming signals are recorded in order of being output from the ADC 22. That is a signal output at the first time is recorded as 51, a signal output at the second time is recorded as 52, and a signal output at the nth time is recorded as 53.

Figure 8:
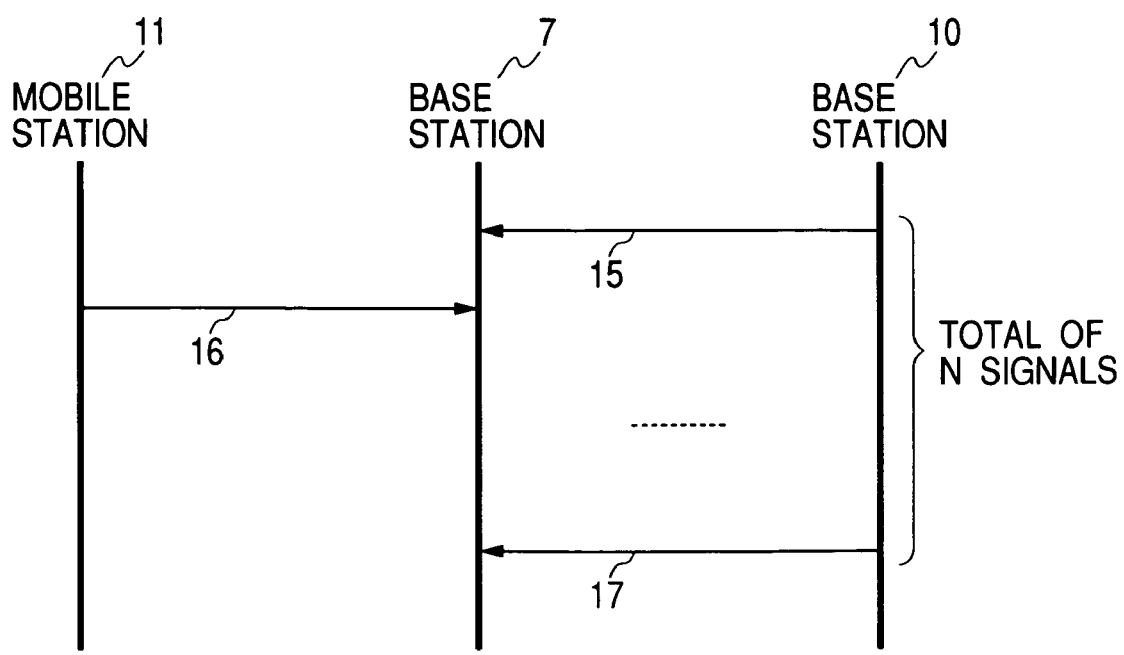
FIG. 8 is a sequence diagram of signals transmitted and received for the first embodiment of the present invention.

For example, as shown in FIG. 8, the base station 7 receives a packet 15 from the base station 10 and then, receives a packet 16 from the mobile station 11. Thereafter, the base station 7 receives n packets. When the source information 46 on the packet 16 received from the mobile station 11 by the base station 7 shows the MAC address of the mobile station 11 and the destination information 45 for the packet 16 shows the MAC address of the base station 7, the packet 16 is a desired incoming signal used for position calculation. The packet 15 is a noise which is not selected in step 73.

Figure 9:
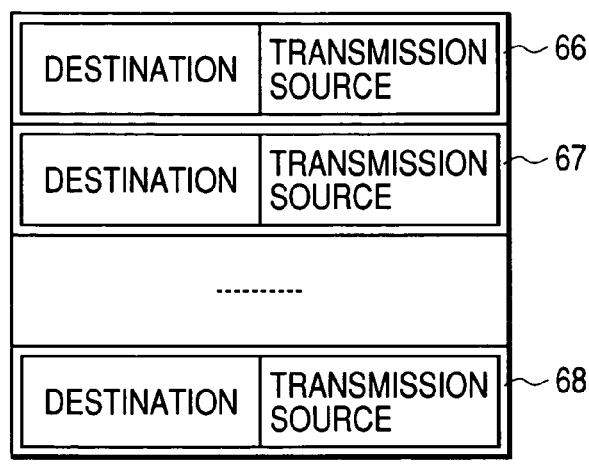
FIG. 9 is a block diagram of the communication information controlled by a control section 35 of the first embodiment of the present invention.

FIG. 9 is a block diagram of the communication information constituted by destination and source information items controlled by the control section 35 of the base station of the first embodiment of the present invention.

Communication information 66 includes the destination information 45 and source information 46 communicated from the analysis section 26 to the control section 35 at the first time. Moreover, communication information 67 includes the destination information 45 and source information 46 communicated from the analysis section 26 to the control section 35 at the second time. Moreover, communication information 68 includes the destination information 45 and source information 46 communicated from the analysis section 26 to the control section 35 at the nth time.

The control section 35 selects a communication information item suitable for a condition used for position calculation by a source and destination from among communication information items 66, 67, and 68. Moreover, the reception time of a signal used for position calculation is specified by specifying the time stamp 50 and the like and the incoming signal 51 and the like corresponding to the communication information suitable for a selected condition out of the contents (FIG. 7) recorded in the accumulation section 33.

Because the recording order of the communication information 66 and the like shown in FIG. 9 is equal to the recording order of the time stamp 50 and the incoming signal 51 and the like, the reception time (time stamp) is specified by using the order of incoming signals recorded in the accumulation section 33 by the control section 35 and the order of incoming signals communicated from the analysis section and thereby mutually relating communication information, time stamps, and incoming signals. That is, when the information communicated from the analysis section 26 at the k-th time is selected, the control section 35 reads out the incoming signal recorded in the accumulation section 33 at the k-th time.

For example, because the communication information 67 is the information communicated and stored at the second time when the communication information 67 is selected as the communication information whose source is the mobile station 11 and whose destination is the server 12, the control section 35 communication information 67 reads out the incoming signals recorded in the accumulation section 33 at the second time, that is, the time stamp 52 and incoming signal 53 correspondingly to the communication information 67 communicated at the second time and discards incoming signals other than incoming signals 52 and 53.

Then, another example of relating communication information with an incoming signal in the case of the first embodiment is described below. Communication information items are related with incoming signals not in accordance with the order of the communication information items but in accordance with time stamps (communication times) of the communication information items.

Figure 10:
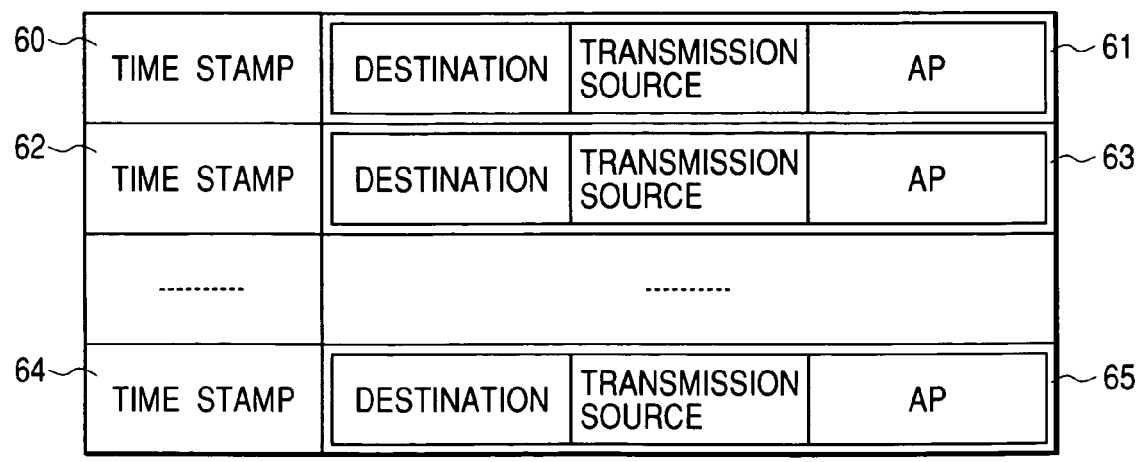
FIG. 10 is another block diagram of the communication information controlled by the control section 35 of the first embodiment of the present invention.

FIG. 10 is a block diagram of the communication information constituted by including destination and source information items controlled by the control section 35 of the base station of the first embodiment of the present invention.

Communication information 61 includes the destination information 45, source information 46, and access point information 47 communicated from the analysis section 26 to the control section 35 at the first time. Moreover, communication information 63 includes the destination information 45, source information 46, and access point information 47 communicated from the analysis section 26 to the control section 35 at the second time. Furthermore, communication information 65 includes the destination information 45, source information 46, and access point information 47 communicated from the analysis section 26 to the control section 35 at the nth time.

When information items 61, 63, and 65 are communicated from the analysis section 26, the control section 35 reads out time stamps 60, 62, and 64 showing times of the information items 61, 63, and 65 from the counter 32 and stores the time stamps 60, 62, and 64 in the memory 37 by relating the time stamps to the communication information items 61, 63, and 65.

The control section 35 selects communication information whose source and destination are suitable for a condition used for position calculation out of the communication information items 66, 67, and 68. Moreover, the control section 35 specifies the time stamp 50 and the like and the incoming signal 51 and the like corresponding to the communication information suitable for the selected condition in accordance with the contents (FIG. 7) recorded in the accumulation section 33 to specify the reception time of a signal used for position calculation.

The reception time (time stamp) is specified in accordance with the time stamp 60 stored correspondingly to the communication information 61 and the like shown in FIG. 9 and the time stamp 50 and the like shown in FIG. 7. That is, the time stamp 60 and the like (FIG. 9) and the time stamp 50 and the like (FIG. 7) are mutually equal or retroactively closest. Therefore, the reception time of a signal is specified by mutually comparing the both time stamps and thereby mutually relating communication information, a time stamp, and an incoming signal.

For example, when the communication information 63 is selected as the communication information whose source is the mobile station 11, whose destination is the server 12, and whose access point is the base station 7, the control section 35 compares the time stamp 62 of the communication information 63 with a time stamp recorded in the accumulation section 33 and selects the time stamp 52 as a time stamp retroactively closest to the time stamp 62. This is because the time when the analysis section 26 communicates an analysis result to the control section 35 and the control section 35 obtains a time stamp from the counter 32 is later than the time when a time stamp is recorded in the accumulation section 33. The control section 35 reads out the time stamp 52 and incoming information 53 from the accumulation section 33 and discards information other than the information items 52 and 53.

FIG. 11 is a block diagram of the base station information stored in the memory 152 of the server 12 of the first embodiment of the present invention.

The identifier 161 of a base station, identifier 162 of the communication channel of each base station, antenna position coordinates 163 of each base station, IP (Internet Protocol) address 164 of each base station, and MAC address 165 of each base station are mutually related and stored. A manager records the base station information is recorded through the user I/F section 153 when constructing a system.

FIG. 12 is a block diagram of mobile station information stored in the memory 152 of the server 12 of the first embodiment of the present invention.

An identifier 171 of a mobile station, identifier 172 of a base station mutually associating mobile stations, IP address 173 of each mobile station, and MAC address of each mobile station are mutually related and stored. The mobile station information is communicated from the base station 7 in accordance with association information 103 (refer to FIG. 5).

The control section 151 reads out MAC addresses of mobile stations and the MAC address of a base station mutually associating mobile stations from the base station information (FIG. 11) and mobile station information (FIG. 12) to generate a signal reception request 105 (or positioning-signal information 117 in the case of a second embodiment).

An example for selecting a signal used for positioning in accordance with three information items such as a source, destination, and access point is described above. However, it is also allowed to select a signal used for positioning by using two information items such as a source (MAC address of the mobile station 11) and a destination (MAC address of the server 12). This is because a signal transmitted from the mobile station 11 to the server 12 after transmitting the positioning request signal (104) is the positioning request signal (108) and therefore, it is possible to select a signal used for positioning without specifying an access point (route information).

Moreover, it is possible to select a signal used for positioning by using only the information on a source (MAC address of the mobile station 11) when stopping transmission of a signal sent from a mobile station to be positioned during a measurement period {period between transmission of the positioning request signal (104) and transmission of the positioning signal (108) } without stopping transmission of a signal sent from other mobile station. This is because a signal transmitted from the mobile station 11 after transmitting the positioning request signal (104) is the positioning signal (108) and therefore, it is possible to select a signal used for positioning without specifying an access point (route information) or a destination (MAC address of the server 12).

Furthermore, it is possible to select a signal used for positioning by using only the information on a destination (MAC address of the server 12) when stopping transmission of a signal to the server 12 (that is, when positioning one station by one station) without stopping other transmission. This is because a signal transmitted to the server 12 after transmitting the positioning request signal (104) is the positioning signal (108) and therefore, it is possible to select a signal used for positioning without specifying an access point (route information) or a source (MAC address of the mobile station 11).

Figure 13:
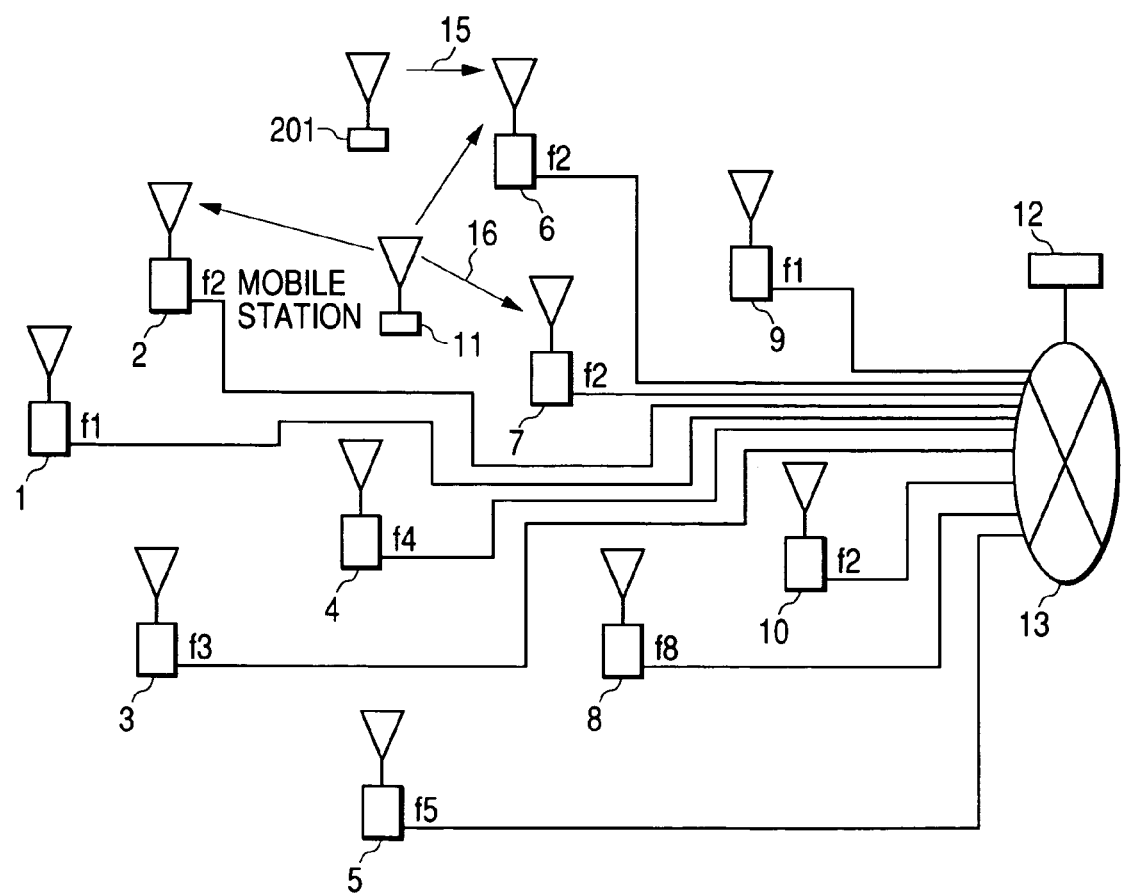
FIG. 13 is another block diagram of a radio communication system of the first embodiment of the present invention.

FIG. 13 shows a configuration of a system for selecting a signal used for positioning by using only the information on a destination (MAC address of the server 12). The mobile station 201 is present in addition to a base station used for positioning and the mobile station 11 positioned in a communicable range.

Figure 14:
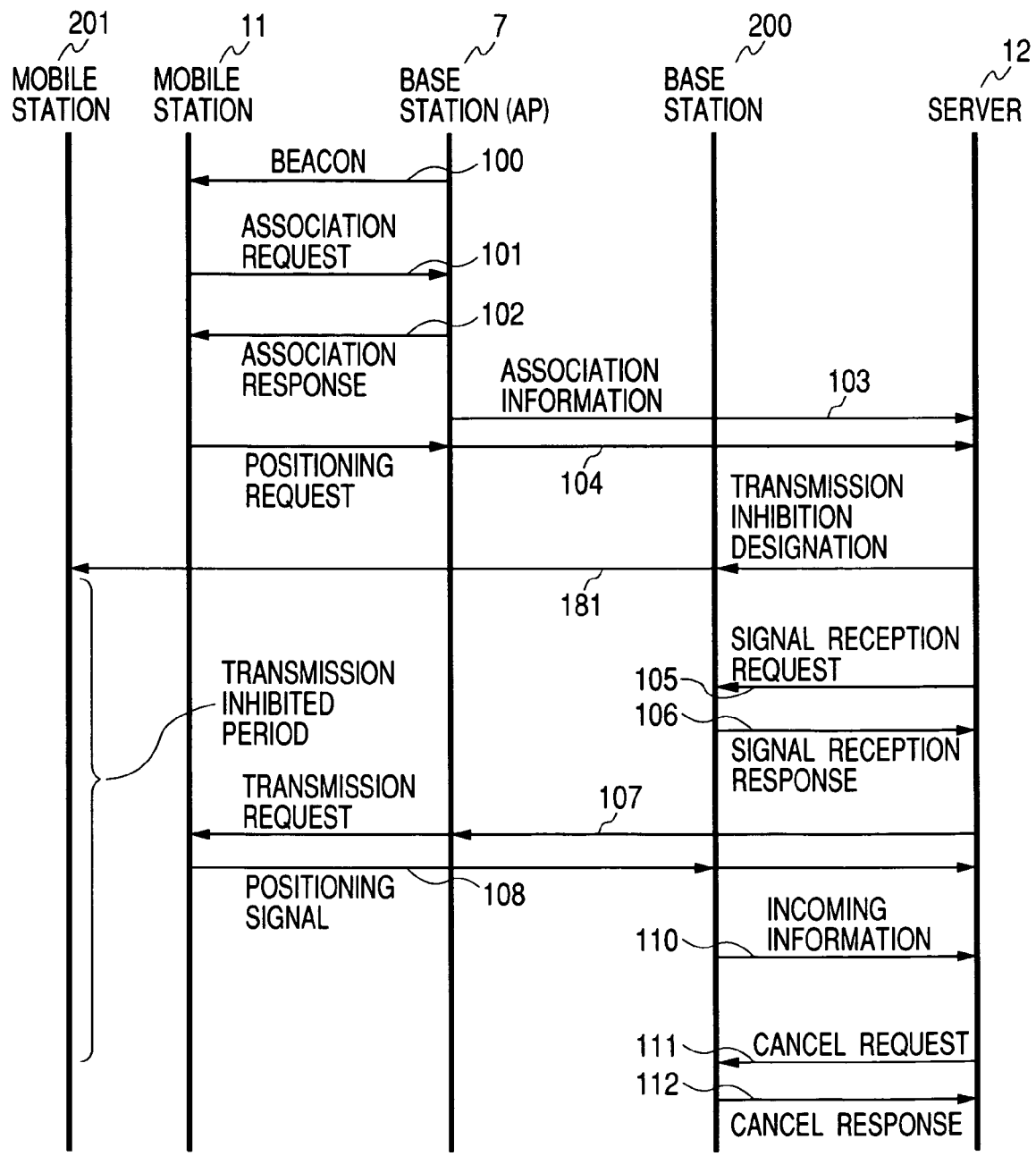
FIG. 14 is another sequence diagram for position calculation of the first embodiment of the present invention.

FIG. 14 shows a sequence diagram for position calculation in the system shown in FIG. 13. When receiving the positioning request 104 from the mobile station 11, the server 12 selects the base station 200 out of base stations respectively capable of receiving a signal from the mobile station 11 and communicates a transmission inhibition designation 181 via the base station 200. A mobile station receiving the transmission inhibition designation 181 stops transmission of information to be performed by an application for a certain period. OSI (Open Systems Interconnection) is included in a network design policy for performing the communication between models different form each other established by the International Standardization Organization (ISO). For example, a communication protocol can be classified into an application layer and its lower layer by the seven hierarchical mode of OSI. For example, a mobile station performs the processing of making a task of the application layer sleep for a certain period. A ping can receive a transmission request (echo request message) in accordance with the bylaw of the ICMP (Internet Control Message Protocol) on an application lower layer and transmit a positioning signal (echo message).

As described above, the first embodiment of the present invention is a position calculating method in which base stations 1 to 10 respectively measure the reception time (reception timing) of a signal incoming from the mobile station 11 to calculate the position of the mobile station 11 by using the reception time and the reception position (antenna position of a base station) of the signal and which obtains the address information items necessary to specify incoming signals used for the position calculation, analyzes destination information (MAC address of the server 12) and/or source information (MAC address of the of the mobile station 11), and moreover access point information (MAC address of a base station), and selects incoming signals used for position calculation in accordance with a result of comparing the obtained address information items with the address information items analyzed in accordance with the incoming signals. Therefore, it is possible to calculate a position by using correct information and restrain deterioration of a positioning accuracy even when receiving an unexpected signal from a walkie-talkie.

Moreover, because a base station captures signals and then selects a desired signal, it is not necessary to stop transmission of a signal by a radio station (mobile station or base station) present in a receivable range from a base station for capturing a signal. Therefore, it is possible to restrain deterioration of the whole throughput of a system compared to the case of stopping transmission of signals during positioning. Furthermore, because it is not necessary to control the transmission by a walkie-talkie not built in a system used for positioning, it is possible to make an independent system set by other businessman or an individual coexist.

Then, a second embodiment of the present invention is described below. In the case of the second embodiment, a mobile station 11 captures and selects incoming signals.

Figure 15:
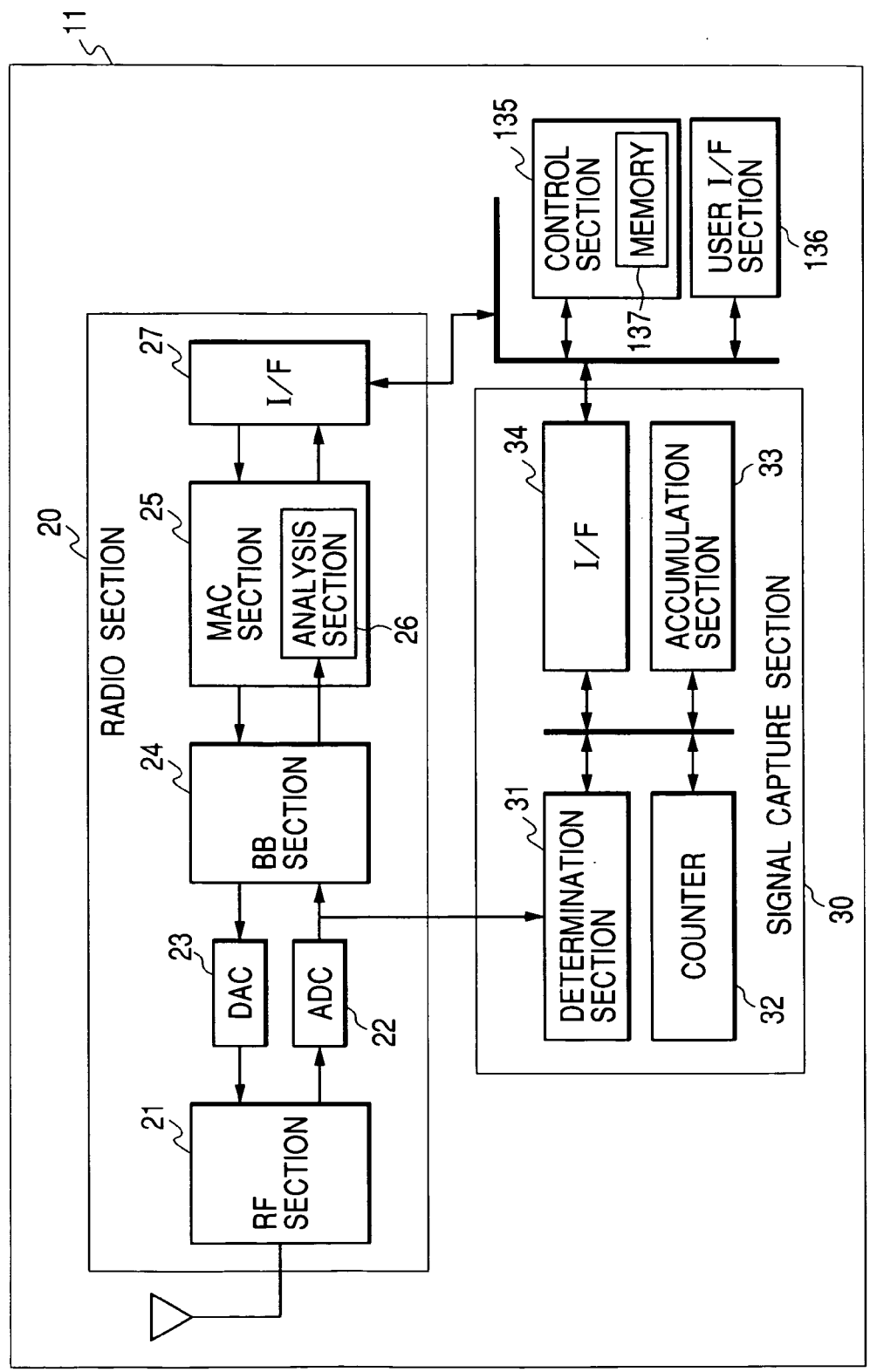
FIG. 15 is a block diagram showing a configuration of a mobile station 11 of a second embodiment of the present invention; and, FIG. 16 is a sequence diagram for position calculation of the second embodiment of the present invention.

FIG. 15 is a block diagram showing a configuration of the mobile station 11 of the second embodiment of the present invention.

A user I/F section 136 is an interface between the mobile station 11 and a user, which includes a display unit and a keyboard.

A control section 135 controls a radio section 20, a signal capture section 30, and the user I/F section 136. Moreover, the control section 135 selects incoming signals recorded in an accumulation section 33 by using the information sent from an analysis section 26.

Because the configuration of the radio section 20 and signal capture section 30 is the same as the case of the base station of the above-described first embodiment (FIG. 2) detailed description of it is omitted. Moreover, because selection of signals recorded in the accumulation section 33 is the same as the case of the above-described first embodiment (FIGS. 6 to 10), detailed description of it is omitted. For example, incoming signals are recorded in the accumulation section 33 in accordance with the format shown in FIG. 7. Furthermore, the control section 135 records the information communicated from the analysis section in accordance with the format shown in FIG. 9 or 10.

Furthermore, because the configuration of a radio communication system, that of base stations 1 to 10, and that of a server 12 are the same as corresponding configurations (FIGS. 1, 2, and 3) of the above-described first embodiment, detailed description of the configurations is omitted.

FIG. 16 is a sequence diagram for position calculation of the second embodiment of the present invention, which shows signals transmitted and received when the mobile station 11 receives signals from a plurality of base stations and the server 12 calculates the position of the mobile station 11.

A base station 7 regularly transmits a beacon and communicates the MAC address of the base station 7 and the ESS-ID showing the network name of a wireless LAN to peripheral stations (100).

The mobile station 11 receiving a beacon transmits an association request including the MAC address of the mobile station 11 to the base station 7 to request the connection to the wireless LAN.

The base station 7 receiving the association request (101) transmits an association response to the mobile station 11 in accordance with an authentication result of the mobile station 11 to communicate success or fail of association (connection to the wireless LAN) (102). When succeeding in the association, the mobile station 11 can communicate with the server 12 through a network 13 by using the base station 7 as an access point.

When the mobile station 11 succeeds in association, the base station 7 transmits the association information including the MAC address of the mobile station 11 and that of the base station 7 to the server 12 (103).

When the mobile station 11 transmits a positioning request (104) to the server 12, the server 12 selects at least three base stations 200 for respectively transmitting a positioning signal. It is allowed that the base station 7 with which the mobile station 11 is associated is included in a base station for transmitting a positioning signal.

Moreover, the server 12 transmits a positioning preparation request to the selected base stations 200 (115). The positioning preparation request (115) includes the information on a communication channel for transmitting signals. For example, the server 12 designates the communication channel of the base station 7 associating the mobile station 11 in accordance with the positioning preparation request (115).

The base station 200 receiving the positioning preparation request (115) transmits a positioning preparation response to the server 12 (116).

The server 12 receiving the positioning preparation response (116) transmits positioning signal information to the mobile station 11 (117). The positioning signal information (117) includes the mobile station 11 to be positioned, base stations 200 for transmitting signals, and the MAC address of the server 12 (network I/F section 36).

The mobile station 11 receiving the positioning signal information (117) clears the information recorded in an internal memory 37 and the accumulation section 33. Moreover, the mobile station 11 transmits a positioning-signal transmission request (118). The positioning-signal transmission request (118) is transmitted to the server 12 via the base station 7.

The server 12 receiving the positioning-signal transmission request (118) transmits a positioning signal to the mobile station 11 via the selected base station 200 (119).

When receiving the positioning signal (119), the mobile station 11 records the signal in the accumulation section 33. The analysis section 26 of the mobile station 11 analyzes the control information on a received packet. The control section 135 of the mobile station 11 selects a desired signal (signal used for positioning) out of the analysis results described below and reads out incoming signals recorded in the corresponding accumulation section 33.

The mobile station 11 transmits the incoming signals read out by the control section 135 and their reception times to the server 12 as incoming information (110).

The server 12 receiving the incoming information (110) from the mobile station 11 transmits a positioning cancel request to the base station 200 (111) and the base station 200 receiving the cancel request (111) transmits a cancel response to the server 12 (112).

The mobile station 11 selects the information on a MAC address designated by the positioning signal information 117 out of the communication information items (FIG. 9) communicated from the analysis section 26 and recorded in an internal memory 137.

Communication information 66 includes destination information 45 and source information 46 communicated from the analysis section 26 to the control section 135 at the first time. Moreover, communication information 67 includes destination information 45 and source information 46 communicated from the analysis section 26 to the control section 135 at the second time. Furthermore, communication information 68 includes destination information 45 and source information 46 communicated from the analysis section 26 to the control section 135 at the nth time.

The control section 135 selects communication information suitable for a condition used for position calculation by a source and a destination out of the communication information items 66, 67, and 68. Moreover, the control section 135 specifies a time stamp 50 and the like and an incoming signal 51 and the like corresponding to the communication information suitable for the selected condition out of the contents recorded in the accumulation section 33 (FIG. 7) and specifies the reception time of a signal used for position calculation.

Because the recording order of the communication information 66 shown in FIG. 9 and the like are equal to the recording order of the time stamp 50 and the like and that of the incoming signal 51 and the like, the reception time (time stamp) of a signal is specified by using the order of incoming signals recorded in the accumulation section 33 by the control section 135 and the order communicated from the analysis section and thereby, relating the communication information with the time stamp and the incoming signal. That is, when the information communicated from the analysis section 26 at the k-th time is selected, the control section 135 reads out the incoming signal recorded at the k-th time to the accumulation section.

For example, when the communication information 67 is selected as the communication information whose source is the server 12 and whose destination is the mobile station 11 by the control section 135, the control section 135 reads out the incoming signal recorded in the accumulation section 33 at the second time, that is, the time stamp 52 and incoming signal 53 correspondingly to the communication information 67 communicated at the second time because the communication information 67 is the information communicated at the second time and discards incoming signals other than the incoming signals 52 and 53.

Moreover, the mobile station 11 cal also select the information on a MAC address designated in accordance with the positioning signal information 117 out of the communication information items (FIG. 10) communicated from the analysis section and recorded in the internal memory 137. In this case, the communication information items are related with incoming signals in accordance with time stamps (communication times) of the communication information items instead of the order of the communication information items.

The communication information 61 includes the destination information 45, source information 46, and access point information 47 communicated from the analysis section 26 to the control section 135 at the first time. Moreover, the communication information 63 includes the destination information 45, source information 46, and access point information 47 communicated from the analysis section 26 to the control section 135 at the second time. Furthermore, the communication information 65 includes the destination information 45, source-information 46, and access point information 47 communicated from the analysis section 26 to the control section 135 at the nth time.

When the communication information items 61, 63, and 66 are communicated from the analysis section 26, the control section 135 reads out time stamps 60, 62, and 64 showing times of the communication information items respectively from a counter 32 and relates the stamps with the communication information items 61, 63, and 65 to store the time stamps in the memory 37.

The control section 135 selects the communication information whose source and destination are suitable for a condition used for position calculation out of the communication information items 66, 67, and 68. Moreover, the control section 135 specifies the time stamp 50 and the like and the incoming signal 51 and the like corresponding to the communication information suitable for the selected condition out of the contents (FIG. 7) recorded in the accumulation section 33 and specifies the reception time of a signal used for position calculation.

The reception time (time stamp) is specified by the time stamp 60 and the like stored correspondingly to the communication information 61 and the like shown in FIG. 9 and the time stamp 50 and the like shown in FIG. 7. That is, because the corresponding time stamp 60 and the like (FIG. 9) and the time stamp 50 and the like (FIG. 7) are equal to or retroactively closest to each other, reception times of signals are specified by comparing the both time stamps and thereby mutually relating communication information, time stamps, and incoming signals.

For example, when the communication information 67 is selected as the communication information whose source is the mobile station 11 and whose destination is the server 12, the control section 135 compares the time stamp 62 of the communication information 63 with a time stamp recorded in the accumulation section 33 and selects the time stamp 52 as a time stamp retroactively closest to the time stamp 62. This is because the time when the analysis section 26 communicates an analysis result to the control section 135 and the control section obtains a time stamp from the counter 32 is later than the time recorded in the accumulation section 33. The control section 135 reads out the time stamp 52 and incoming information 53 from the accumulation section 33 and discards information items other than the information items 52 and 53.

Though an example of calculating a position by the server 12 in accordance with a signal received by the mobile station 11 is described above, it is also allowed to calculating a position by the control section 135 of the mobile station 11. In this case, it is not necessary to transmit the information read out from the accumulation section 33 to the server 12 as the incoming information (110).

Moreover, also in the case of the second embodiment, an example of selecting a signal used for positioning in accordance with three information items on a source, destination, and access point is described. It is also possible to select a signal used for positioning by using two information items on a source (MAC address of the server 12) and an access point (MAC address of a base station) when stopping transmission of signals sent from the server 12 during a measurement period {period between transmission of the positioning request signal (104) and transmission of the positioning signal (108)} (that is, when positioning one station by-one station) without stopping other transmission. This is because a signal transmitted from the server 12 is the positioning signal (119) after transmitting the positioning signal information (117) and thereby, it is possible to select a signal used for positioning without specifying a destination (MAC address of the mobile station 11).

As described above, the second embodiment of the present invention is a position calculating method in which the mobile station 11 measures reception times (reception timings) of signals incoming from the base stations 1 to 10 to calculate the position of the mobile station 11 by using the reception times and the reception positions (antenna position of a base station) of the signals and which obtains address information items necessary to specify incoming signals used for the above position calculation, analyzes the destination information (MAC address of the mobile station 11), source information (MAC address of the server 12), and moreover access point information (MAC address of a base station) included in the incoming signals, and selects incoming signals used for position calculation in accordance with a result of comparing the obtained address information items with address information items analyzed in accordance with the incoming signals. Therefore, even when receiving an unexpected signal from a walkie-talkie unrelated to positioning in a channel in which a mobile station or base station performs positioning, it is possible to calculate a position by using correct information and restrain the deterioration of a positioning accuracy.

Moreover, because the mobile station 11 captures signals and then selects a desired signal, it is not necessary to stop transmission of signals by a radio station (mobile station or base station) present in a receivable range from the mobile station 11 capturing signals. Therefore, it is possible to restrain deterioration of the whole throughput of a system during positioning compared to the case of stopping transmission of signals. Moreover, because it is not necessary to control the transmission by a walkie-talkie not built in a system used for positioning, it is possible to make an independent system set by other businessman or an individual coexist.

The following are typical aspects of the present invention other than the aspects described in claims.

(1) A mobile communication system for performing communication between a base station and a mobile station, measuring reception times of signals transmitted and received between the base station and the mobile station, and calculating the position of the mobile station by using reception times and reception positions of the signals, comprising:

information obtainment unit for obtaining address information items necessary to specify incoming signals used for the position calculation;

address information analysis unit for analyzing the address information items included in the incoming signals; and control unit for selecting incoming signals used for position calculation in accordance with a result of comparing the obtained address information items with address information items analyzed in accordance with the incoming signals.

(2) The mobile communication system according to the above item (1), wherein
the base station is provided with reception timing measurement unit for measuring reception timings of signals incoming from the mobile station,
the information analysis unit analyzes the destination information and/or source information included in the incoming signals as the address information items, and
the control unit selects incoming signals used for position calculation in accordance with a result of comparing the obtained address information items with the destination information and/or source information analyzed in accordance with the incoming signals.

(3) The mobile communication system according to the above item (1), wherein
the base station is provided with reception timing measurement unit for measuring reception timings of signals incoming from the mobile station and storage unit for storing the incoming signals, and
the control unit selects the stored incoming signals by using the analyzed address information items.

(4) The mobile communication system according to the above item (3), wherein
the control unit selects incoming signals by using the order in which incoming signals are stored in the storage unit and the order in which the address information items are analyzed and relating the stored incoming signals with the address information items.

(5) The mobile communication system according to the above item (3), wherein
the control unit selects incoming signals by using the reception timings of the incoming signals and times when the address information items are analyzed and mutually relating the stored incoming signals and the address information items.

(6) The mobile communication system according to the above item (1), wherein
the mobile station is provided with reception timing measurement unit for measuring reception timings of signals incoming from the base station and storage unit for storing the incoming signals, and
the control unit selects the stored incoming signals by using the analyzed address information items.

(7) The mobile communication system according to the above item (1), wherein MAC addresses are used as the address information items.

What is claimed is:

1. A position calculating method of measuring reception timings of signals transmitted and received between a base station and a mobile station and calculating the position of the mobile station by using the reception timings and position of the base station, comprising the steps of:
obtaining address information items necessary to specify incoming signals used for the position calculation;
analyzing the address information items included in the incoming signals; and selecting incoming signals used for position calculation in accordance with a result of comparing the obtained address information items with the address information items analyzed in accordance with the incoming signals.

2. The position calculating method according to claim 1, wherein the base station;
measures reception timings of signals incoming from the mobile station,
analyzes the destination information and/or source information included in the incoming signals as the address information items, and
selects incoming signals used for position calculation in accordance with a result of comparing the obtained address information items with the destination information and/or source information analyzed in accordance with the incoming signals.

3. The position calculating method according to claim 1, wherein the base station;
measures reception timings of signals incoming from the mobile station, accumulates the incoming signals,
analyzes the address information items included in the incoming signals, and selects the accumulated incoming signals by using the address information items.

4. The position calculating method according to claim 3, wherein incoming signals are selected by using the order in which the incoming signals are accumulated and the order in which the address information items are analyzed and thereby relating the accumulated incoming signals with the address information items.

5. The position calculating method according to claim 3, wherein
incoming signals are selected by using the reception timings of the incoming signals and times when the address information items are analyzed and thereby relating the accumulated incoming signals with the address information items.

6. The position calculating method according to claim 1, wherein
the mobile station;
measures reception timings of signals incoming from the base station, accumulates the incoming signals,
analyzes the address information items included in the incoming signals, and selects the accumulated incoming signals by using the address information items.

7. The position calculating method according to claim 6, wherein
incoming signals are selected by using the order in which the incoming signals are accumulated and the order in which the address information items are analyzed and thereby relating the accumulated incoming signals with the address information items.

8. The position calculating method according to claim 6, wherein incoming signals are selected by using reception timings of the incoming signals and times when the address information items are analyzed and thereby relating the accumulated incoming signals with the address information items.

9. The position calculating method according to claim 1, wherein
the address information items use MAC addresses.

10. A receiver for receiving a signal transmitted from a mobile station in order to calculate the position of the mobile station by using the reception timing and reception position of the signal transmitted from the mobile station, comprising:
reception timing measurement unit for measuring the reception timing of the signal incoming from the mobile station;
information obtainment unit for obtaining the address information items necessary to specify incoming signals used for the position calculation; storage unit for storing the incoming signals;
address information analysis unit for analyzing the address information items included in the incoming signals; and
control unit for selecting incoming signals used for position calculation in accordance with a result of comparing the obtained address information items with the address information items analyzed in accordance with the incoming signals.

11. The receiver according to claim 10, wherein the information analysis unit analyzes the destination information and/or source information included in the incoming signals as the address information items, and the control unit selects incoming signals used for position calculation in accordance with a result of comparing the obtained address information items with the destination information and/or source information analyzed in accordance with the incoming signals.

12. The receiver according to claim 10, wherein the receiver includes storage unit for storing the incoming signals, and
the control unit selects the stored incoming signals by using the analyzed address information items.

13. The receiver according to claim 12, wherein
the control unit selects incoming signals by using the order in which the incoming signals are stored in the storage unit and the order in which the address information items are analyzed and thereby relating the stored incoming signals with the address information items.

14. The receiver according to claim 12, wherein
the control unit selects incoming signals by using reception timings of the incoming signals and the time when the address information items are analyzed and relating the stored incoming signals with the address information items.

15. A position calculating apparatus for calculating the position of a mobile station by using reception timings and reception positions of signals transmitted and received between the mobile station and a base station associated with the mobile station, comprising:
a network interface for receiving association information of the mobile station including address information of the base station associated with the mobile station; and
a control unit for communicating said address information of the associated base station to a plurality of receivers; wherein
the address information is used by receivers to identify incoming signals used for the position calculation.

* * * * *